US011423475B2

(12) United States Patent
Wang et al.

(10) Patent No.: US 11,423,475 B2
(45) Date of Patent: Aug. 23, 2022

(54) DISTRIBUTED ELECTRONIC RECORD AND TRANSACTION HISTORY

(71) Applicant: Visa International Service Association, San Francisco, CA (US)

(72) Inventors: Quan Wang, Foster City, CA (US); Shiv Bhatt, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 671 days.

(21) Appl. No.: 16/316,958

(22) PCT Filed: Sep. 27, 2016

(86) PCT No.: PCT/US2016/054023
§ 371 (c)(1),
(2) Date: Jan. 10, 2019

(87) PCT Pub. No.: WO2018/063167
PCT Pub. Date: Apr. 5, 2018

(65) Prior Publication Data
US 2019/0295162 A1  Sep. 26, 2019

(51) Int. Cl.
*G06Q 20/40* (2012.01)
*G06Q 30/02* (2012.01)
(Continued)

(52) U.S. Cl.
CPC ......... *G06Q 40/025* (2013.01); *H04L 9/0866* (2013.01); *H04L 9/30* (2013.01); *H04L 9/3247* (2013.01); *G06Q 2220/10* (2013.01)

(58) Field of Classification Search
CPC .. G06Q 40/00–128; G06Q 2220/00–18; H04L 9/00–38
See application file for complete search history.

(56) References Cited

U.S. PATENT DOCUMENTS 9,363,283 B1  6/2016 Herrera-yagüe et al.
10,735,182 B2 * 8/2020 Jutla ................. G06F 16/435
(Continued)

FOREIGN PATENT DOCUMENTS

| CN | 1953375   | 4/2007 |
| CN | 101512576 | 8/2009 |
| WO | 0213444   | 2/2002 |

OTHER PUBLICATIONS

Antonopoulos, A. Mastering Bitcoin, Dec. 2014, O'Reilly Media Inc., First Edition, pertinent pp. 1, 50, 242, (Year: 2014).*

(Continued)

*Primary Examiner* — John W Hayes
*Assistant Examiner* — Chenyuh Kuo
(74) *Attorney, Agent, or Firm* — Kilpatrick Townsend & Stockton LLP (57) ABSTRACT

Described herein is a system in which an electronic record is stored on a distributed environment. In this system, a computing entity that receives an action request with respect to an account may receive or generate an electronic identifier for that account. The computing entity may then identify an electronic record comprising a number of interaction records related to the electronic identifier within the distributed environment. The computing entity is then able to request account-specific information directly from an originating entity for each of the interaction records. In some embodiments, the computing entity may separately determine a level of trust to be associated with each originating entity. In some embodiments, the computing entity may determine a risk level to be associated with an action indicated in the action request based on the received account-specific information.

14 Claims, 6 Drawing Sheets

(51) Int. Cl.
*G06Q 20/32* (2012.01)
*G06Q 20/34* (2012.01)
*G06Q 20/38* (2012.01)
*G06Q 40/02* (2012.01)
*H04L 9/30* (2006.01)
*H04L 9/32* (2006.01)
*H04L 9/08* (2006.01)

(56) References Cited

U.S. PATENT DOCUMENTS

| | | | |
|---|---|---|---|
| 10,909,510 B1* | 2/2021 | Kurani | G06Q 20/065 |
| 11,080,700 B2* | 8/2021 | Ortiz | G06Q 20/3267 |
| 2002/0007343 A1* | 1/2002 | Oyama | G06Q 20/3829 |
| | | | 705/40 |
| 2003/0101348 A1* | 5/2003 | Russo | G06Q 30/06 |
| | | | 713/185 |
| 2005/0132201 A1 | 6/2005 | Pitman et al. | |
| 2008/0059364 A1 | 3/2008 | Tidwell et al. | |
| 2015/0302400 A1 | 10/2015 | Metral | |
| 2015/0332283 A1 | 11/2015 | Witchey | |
| 2016/0042345 A1 | 2/2016 | Kopczynski et al. | |
| 2016/0164884 A1 | 6/2016 | Sriram et al. | |
| 2018/0060954 A1* | 3/2018 | Yin | G06F 21/31 |
| 2018/0191502 A1* | 7/2018 | Karame | H04L 9/3271 |
| 2020/0036707 A1* | 1/2020 | Callahan | H04L 9/3231 |

OTHER PUBLICATIONS

SG11201811426U, "Written Opinion", dated Apr. 7, 2020, 8 pages.
PCT/US2016/054023, "International Search Report and Written Opinion", dated Jun. 12, 2017, 13 pages.
Application No. EP16917877.9, Notice of Decision to Grant, dated Jan. 21, 2021, 2 pages.
Lawrence, "Can A Dynamic IP Address Constitute Personal Data?", Fieldfisher, Insight, Jun. 30, 2016, 4 pages.
Application No. SG11201811426U, Written Opinion, dated Mar. 5, 2021, 7 pages.
"Decentralized Reputation in OpenBazaar?-?Part 1—OpenBazaar—Medium", Openbazaa, Available Online at , https://medium.com/@therealopenbazaar/decentralized-reputation-in-openbazaar-4e3a3d0b0899, Oct. 8, 2015, 21 pages.
"Decentralized Reputation in OpenBazaar?-?Part 2—OpenBazaar—Medium", Openbazaar, Available Online at-https://medium.com/@therealopenbazaar/decentralized-reputation-part-2-6233cf2127bb, Oct. 15, 2015, 19 pages.
Dennis et al., "Rep on the Block: A Next Generation Reputation System Based On the Blockchain", 10th international Conference for Internet Technology and Secured Transactions, Dec. 14, 2015, pp. 131-138.
EP16917877.9, "Extended European Search Report", dated Aug. 29, 2019, 10 pages.
Application No. CN201680089236.4, Office Action, dated Sep. 3, 2021, 19 pages.

\* cited by examiner

DISTRIBUTED ELECTRONIC RECORD AND TRANSACTION HISTORY

CROSS REFERENCE TO RELATED APPLICATIONS

This application is the US national stage of PCT/2016/054023, filed Sep. 27, 2016, the disclosure of which is incorporated herein by reference in its entirety.

BACKGROUND

With the proliferation of the Internet, the number of services available to users has increased dramatically. Consumers now have access to service providers across the world. As a result, the average consumer now maintains multiple accounts with a number of service providers providing various services. However, these service providers often need to determine whether to provide a service to each consumer. For the service provider, this means collecting a number of consumer-specific, and often sensitive, details to determine a risk level for that consumer. For the consumer, this means providing the same information to each service provider that the consumer wishes to maintain an account with.

The conventional processes associated with allowing users to obtain multiple services is time consuming and slow. For example, a user may have applied for and obtained a loan at a first bank. During the process of obtaining the first loan, the user will need to provide personal information such as the user's income, social security number, date of birth, and other information. The first bank may run various credit checks and other authentication processes to ensure that the user is an authentic user and is also creditworthy. This process can take days, because the first bank needs to communicate with various entities (e.g., credit bureaus, employers, etc.) to gather information to arrive at a decision as to whether or not to provide the loan to the user. At a later point in time, the user may want to apply for a second loan at a second bank. When applying for the loan at the second bank, the second bank may follow similar loan approval processing as described above for the first bank. In addition, since the user already has a loan with the first bank, the second bank may communicate with the first bank to obtain information indicative of the user's creditworthiness. Similar to the loan process associated with the first bank, this process can also take days.

Further, in conventional record systems, service providers may consult with credit bureaus to determine a level of risk for each consumer. However, these credit bureaus may provide a risk assessment rating (e.g., a credit score) without providing any context. In other words, these credit bureaus often keep their algorithms classified and a service provider is unable to perform its own analysis with respect to a particular consumer. This means that the consumer's credit rating may be based on records submitted by entities that the service provider may or may not trust. Thus, the service provider may be making a decision as to whether or not to provide the requested service based upon criteria that is not entirely understood or within the knowledge of the service provider.

Embodiments of the invention address these and other problems, individually and collectively.

BRIEF SUMMARY

Embodiments of the disclosure are directed to a system in which an electronic record may be generated for an entity within a distributed environment. The electronic record may comprise a number of interaction records that involve a user, where the interaction records are each signed by a an originating entity such as a first service provider (e.g., a bank) using that the first service provider's private key. The authenticity of the interaction records may be verified by a second service provider that wishes to provide a service to the user using a public key associated with the first service provider. Each interaction record may be associated with a user, which may be assigned an electronic identifier. In some embodiments, the electronic identifier may be generated for an account using account-specific information in a predetermined format. In some embodiments, the electronic identifier may be hashed or encrypted in order to prevent unauthorized access of personal details.

One embodiment of the invention is directed to a server apparatus comprising one or more processors, and a memory including instructions that, when executed by the one or more processors, cause the server apparatus to receive a request from a computing device to conduct an action with respect to a user, identify an electronic identifier associated with a user, the electronic identifier having been generated from information specific to the user, identify, within a verification network, an electronic record comprising a number of interaction records associated with the electronic identifier, each of the interaction records signed by an originating entity, verify the authenticity of at least one interaction record of the plurality of interaction records using a public key associated with the originating entity, and determine, based at least in part on the verified interaction record, whether to execute the action.

Another embodiment of the invention is directed to a method comprising receiving a request from a computing device to conduct an action with respect to a user, identifying an electronic identifier associated with a user, the electronic identifier having been generated from information specific to the user, identifying, within a verification network, an electronic record comprising a number of interaction records associated with the electronic identifier, each of the interaction records signed by an originating entity, verifying the authenticity of at least one interaction record of the plurality of interaction records using a public key associated with the originating entity, and determining, based at least in part on the verified interaction record, whether to execute the action.

These and other embodiments of the invention are described in further detail below.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing the details of some embodiments of the present invention, description of some terms may be helpful in understanding the various embodiments.

An "application server" may be any computing device configured to provide remote support for a client device. The application server may be associated with a set of computer executable instructions to be installed on, and executed from, a client device (e.g., a mobile application). The application server may provide any suitable service and/or processing for the client device. For example, the application server may perform calculations on behalf of the client device. In some embodiments, the application server may maintain an account for one or more users. The application server may also store any protocols and/or user preferences related to the operation of the client device.

A "blockchain" can be a distributed database that maintains a continuously-growing list of records secured from tampering and revision. A blockchain may include a number of blocks of interact records. Each block in the blockchain can contain also include a timestamp and a link to a previous block. Stated differently, interaction records in a blockchain may be stored as a series of "blocks," or permanent files that include a record of a number of transactions occurring over a given period of time. Blocks may be appended to a blockchain by an appropriate node after it completes the block and the block is validated. In embodiments of the invention, a blockchain may be distributed, and a copy of the blockchain may be maintained at each node in a verification network. Any node within the verification network may subsequently use the blockchain to verify transactions.

A "client device" may be any electronic device capable of establishing a communication session with another electronic device (e.g., an application server) and transmitting/receiving data from that device. A client device may include the ability to download and/or execute mobile applications. Client devices may include mobile communication devices as well as personal computers and thin-client devices.

A "cryptographic key" may be any string of bits used by a cryptographic algorithm to transform plain text into cipher text or vice versa. Cryptographic keys may include symmetric and asymmetric keys. A cryptographic key may be used to sign transactions and/or verify signed transactions. For example, a cryptocurrency transaction may be signed using a private key. The signed transaction may then be verified using a public key that corresponds to the private key.

An "electronic identifier" may be any suitable string of characters or symbols used to identify an entity (e.g., a person or device). In some embodiments, the electronic identifier may be a value calculated by hashing one or more input values available to multiple entities. In this way, the electronic identifier may be independently generated by any entity that has the prerequisite information. In order to prevent an electronic record from being accessed by an unauthorized party, an electronic identifier may be hashed or encrypted. For example, an electronic identifier may comprise a combination of a country code, customer name, date of birth, and last four digits of a social security number such as SHA256(USA*JOHN SMITH*19700101*1234). Hashing this value may result in a seemingly random string of characters, such as 444E982513BF546050C2D079FF5D65AB6E318E1AB5 C1C. In some embodiments, the electronic identifier is associated with a passphrase that must be provided in order to access any interaction record associated with the electronic identifier.

An "electronic record" may be any record of transactions stored electronically. For example, an electronic record may comprise a number of interaction records associated with an electronic identifier. In some embodiments, an electronic record may be compiled by identifying each of the interaction records recorded in a distributed environment that are associated with a particular electronic identifier. In some embodiments, the electronic record may include a portion generated by, and signed using a private key associated with, the user with which the electronic identifier is associated. In some embodiments, the electronic record may be in the form of a blockchain.

An "interaction record" is any indication of a transaction that occurred between a user associated with an electronic identifier and another entity. In some embodiments, each of the interaction records in an electronic record may be signed using a private key associated with the entity, such that they may be verified using a public key associated with the entity. An interaction record may include an indication of a location of user-specific information (e.g., an address in a database table).

A "mobile communication device" may be any portable electronic device that has a primary function related to communication. For example, a mobile communication device may be a smart phone, a personal data assistant (PDA), or any other suitable handheld device. The mobile communication device may be configured to input cryptocurrency addresses and display any received aliases. In some embodiments, the mobile communication device may be configured to store a private key to be associated with a cryptocurrency address and/or alias.

A "private key" is a type of cryptographic key that is kept secret by a party. A private key may be used to sign transactions such that they may be verified using the verification network.

A "public key" may be a type of cryptographic key that is distributed to, or available to, some entity over than a party holding a corresponding private key. In some embodiments, the key may be publically available, while in other cases it may be distributed to nodes in a network, but the network itself may not be accessible to the general public. A public key may be made available to nodes of a verification network so that signed transactions associated with the public key may be verified by the nodes.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing. In some examples of verification described in the disclosure, electronic records may be signed using a private key and verified using a public key.

A "verification network" may be any set of nodes (computer systems and components) configured to provide verification for a transaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the verification network can be enabled by wired or wireless connections and combinations thereof. Nodes may be independently operated by third parties and may be added to, or removed from, the verification network on a continuous basis. In some embodiments, each of the nodes in a verification network may be computing devices belonging to a particular group or organization.

Details of some embodiments of the present invention will now be described.

Figure 1:
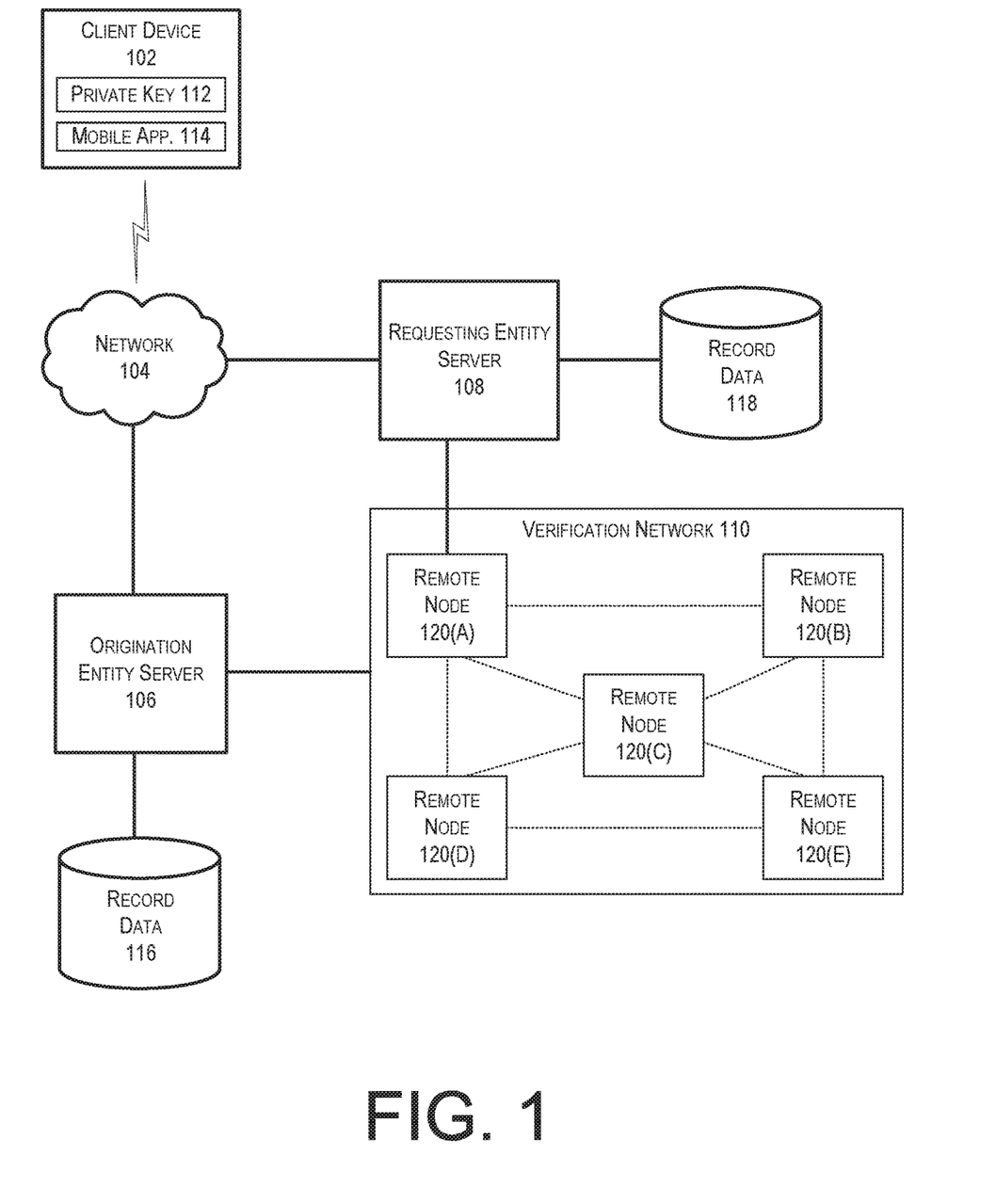
FIG. 1 depicts an example system in which electronic record associated with a user may be stored on, and verified using, a distributed environment in accordance with at least some embodiments.

FIG. 1 depicts a block diagram of an exemplary system in which electronic record associated with a user may be stored on, and verified using, a distributed environment in accordance with at least some embodiments. In FIG. 1, a client device 102 may be in communication with one or more separate entities via a network connection 104. For example, the client device 102 may be in communication with a origination entity server 106 and a requesting entity server 108. In some embodiments, the system may include multiple origination entity servers (associated with a number of different signed entities) and/or multiple requesting entity servers (associated with a number of different requesting entities). In some embodiments, upon processing a request in accordance with embodiments of the disclosure, a requesting entity server 108 may become a origination entity server 106. Each of the separate entities may also be in communication with a verification network 110, which may provide verification services related to an electronic record.

The client device 102 may comprise any suitable computing device capable of interacting storing and managing an electronic record in accordance with embodiments of the disclosure. The client device may include at least a processor and a memory. The memory of the client device 102 may include a private key 112 that may be used to sign an electronic record. The memory may also include computer-executable instructions that cause the processor to perform certain functions in accordance with embodiments of this disclosure. For example, the memory may include a mobile application 114 that causes the mobile device to create and sign an electronic record and initiate transactions using that electronic record.

The memory of the client device 102 may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities. Sensitive information (e.g., the private key 112) received by the client device 102 may be stored in the secure memory.

The client device 102 may also establish a connection with an application server that provides back end support for the client device 102 by maintaining and managing electronic records associated with a user and/or client device 102. In some embodiments, upon execution of the mobile application 114 the client device 102 may establish a communication session with an application server in which at least some processing is performed by the application server on behalf of the mobile application 114. In some embodiments, the application server may maintain an account associated with the client device 102 and/or its user. The account maintained by the application server may store a number of data related to the user. For example, the application server may store user data (e.g., demographic or other suitable information), documentation related to the user (e.g., bank statements, property deeds, etc.), or any other suitable user data. The application server may, upon receiving a request from the mobile application, compile at least a portion of the user data that it maintains into an electronic record to be provided to the client device 102. In some embodiments, the application server may also have access to the private key 112, and may sign the electronic record on behalf of the client device 102.

In some embodiments, the client device 102 may include a communication interface configured to enable communication between the client device 102 and another electronic device (e.g., origination entity server 106, requesting entity server 108, and/or a wireless router that manages access to network 104). Examples of a suitable communication interface may include radio frequency (RF) transceivers configured to send and receive communications using near-field communications (NFC), or other radio frequency or wireless communication protocols such as Bluetooth, Bluetooth low-energy (BLE), a wireless local area network (e.g., WiFi), iBeacon, etc. In some embodiments, the communication interface may include an infrared communication device. In some embodiments, the communication interface may include both long range and short range communication means. For example, the communication interface may include an antenna configured to connect to a cellular network in order to enable communication with various other components of the depicted architecture.

The origination entity server 106 may comprise any suitable computing device capable of performing the operations described herein. A origination entity server 106 may be any server that has "signed" (e.g., verified an authenticity of) an electronic record. A requesting entity server 108, after verifying and signing an electronic record, may become a origination entity server 106. The origination entity server 106 may maintain first record data 116 associated with a particular electronic record. In some embodiments, record data 116 may be maintained by a third-party entity (e.g., an entity unaffiliated with the origination entity server 106). In some embodiments, the record data 116 may be stored such that it is not easily associated with a particular user or account holder. For example, the record data 116 may comprise a number of resource locator addresses that reference user data without an indication of the user. In some embodiments, the origination entity server 106 may store a record of a user may related to each resource locator address in a separate data store. In some embodiments, the origination entity server 106 may be configured to receive a request from a requesting entity server 108, identify account information stored in association with the request (e.g., at an address specified in the request), and provide that information to the requesting entity server 108.

The requesting entity server 108 may comprise any suitable computing device capable of performing the operations described herein. An example of a requesting entity server 108 that may be implemented in accordance with various embodiments is described in greater detail with respect to FIG. 2. As described with respect to FIG. 2, the requesting entity server 108 may assign an address in a second record data 118 to a user in response to receiving an electronic record. In some embodiments, record data 118 may be maintained by a third-party entity (e.g., an entity unaffiliated with the requesting entity server 108).

In some embodiments, the requesting entity server 108 may be configured to receive information (such as an indication of an electronic record) from the client device 102 (or from an application server on behalf of the client device 102), perform a verification of the electronic record, and/or request additional account-related information from a origination entity server 106. For example, the requesting entity server 108 may determine that the electronic record has been signed by a particular origination entity server 106, verify (e.g., by using the signing entity's public key) the signing entity's signature in the electronic record, determine a verification value to be associated with the origination entity server 106, and request additional information from the origination entity server 106 (e.g., at a resource address within the electronic record).

A verification network 110 may comprise a distributed environment implemented across number of remote nodes 120 (A-E), each of which represents a computing system or component. A copy of a blockchain (a record of electronic records) may be distributed to each remote node 120 within the verification network 106. In some embodiments, at least some of the remote nodes 120 may each be owned and/or operated by at least one of the signing entity or the requesting entity. In some embodiments, the verification network 110 may comprise a number of computing devices operated by entities that each belong to a particular group or have obtained a particular certification. In some embodiments, at least one of the origination entity server 106 or the requesting entity server 108 may be a remote node 120. Additionally, one or more of the remote nodes 120 may act to verify interaction records.

In accordance with at least some embodiments, the verification network 110 may comprise a federated and/or permission-based environment. For example, in order to participate in, or use, the verification network 110, an entity may need to be certified or otherwise authenticated. For example, the verification network 110 may require that each entity be subject to trust services management (TSM) policies and/or rules. In some examples, different entities may be subject to different policies based on the type of entity that it is. For example, servers associated with a banking institution may be trusted automatically, whereas servers associated with an individual may need to receive certification from a banking institute. In these examples, only trusted entities may have access to the verification network 110.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1. In addition, the components in FIG. 1 may communicate via any suitable communication medium (including the internet), using any suitable communications policy.

Figure 2:
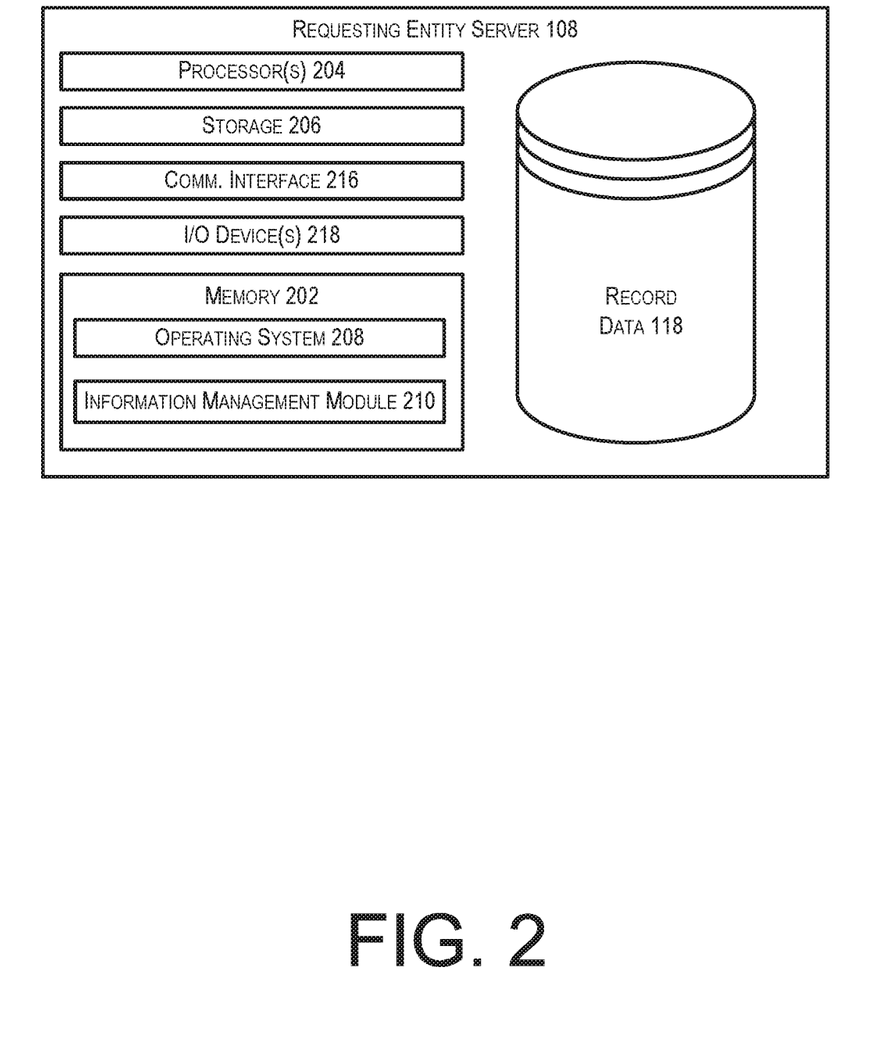
FIG. 2 depicts an example requesting entity server configured to update user record data to reflect data verified via a distributed environment in accordance with at least some embodiments.

FIG. 2 depicts a diagram of an exemplary requesting entity server 108 that can be configured to update user record data to reflect data verified via a distributed environment in accordance with at least some embodiments. The requesting entity server 108 may be an example requesting entity server 108 of FIG. 1.

The requesting entity server 108 may be any type of computing device capable of receiving an electronic record, verifying the electronic record with at least one entity that has signed the electronic record, and optionally obtaining account information from the at least one entity. In at least some embodiments, the requesting entity server 108 may include at least one memory 202 and one or more processing units (or processor(s)) 204. The processor(s) 204 may be implemented as appropriate in hardware, computer-executable instructions, firmware or combinations thereof. Computer-executable instruction or firmware embodiments of the processor(s) 204 may include computer-executable or machine executable instructions written in any suitable programming language to perform the various functions described.

The memory 202 may store program instructions that are loadable and executable on the processor(s) 204, as well as data generated during the execution of these programs. Depending on the configuration and type of requesting entity server 108, the memory 202 may be volatile (such as random access memory (RAM)) and/or non-volatile (such as read-only memory (ROM), flash memory, etc.). The requesting entity server 108 may also include additional storage 206, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the requesting entity server 108. In some embodiments, the memory 202 may include multiple different types of memory, such as static random access memory (SRAM), dynamic random access memory (DRAM) or ROM.

Turning to the contents of the memory 202 in more detail, the memory 202 may include an operating system 208 and one or more application programs or services for implementing the features disclosed herein including at least a module for extracting verified information from signing entities (information management module 210). The memory 202 may also include record data 118, which provides data associated with a user and/or account.

In some embodiments, the information management module 210 may, in conjunction with the processor 204, be configured to receive an indication of an electronic record from a client device. For example, the information management module 210 may receive an address or location associated with the electronic record within a distributed environment. In this example, the information management module 210 may locate the electronic record, identify a number of entities that have signed the electronic record, determine addresses/locations of records associated with each of the entities that signed the electronic record, and retrieve the records at each of those locations. In some embodiments, the information management module 210 may, in conjunction with the processor 204, be further configured to populate a number of attributes associated with the client device and/or a user of the client device. In some embodiments, the information management module 210 may determine a level of trust (e.g., a trust value) to be associated with each of the entities that have previously signed the electronic record. The information management module 210 may, in conjunction with the processor 204, also be configured to cause the requesting entity server 108 to sign the electronic record using its private key upon verifying one or more piece of data within the electronic record. The signed electronic record may then be distributed across the verification network and subsequently added to the blockchain.

The requesting entity server 108 may also contain communications interface(s) 216 that enable the requesting entity server 108 to communicate with a stored database, another computing device or server, one or more remote devices, other application servers, and/or any other suitable electronic devices. In some embodiments, the communication interface 216 may enable the requesting entity server 108 to communicate with other electronic devices on a network (e.g., on a private network). The requesting entity server 108 may also include input/output (I/O) device(s) and/or ports 218, such as for enabling connection with a keyboard, a mouse, a pen, a voice input device, a touch input device, a display, speakers, a printer, etc.

Figure 3:
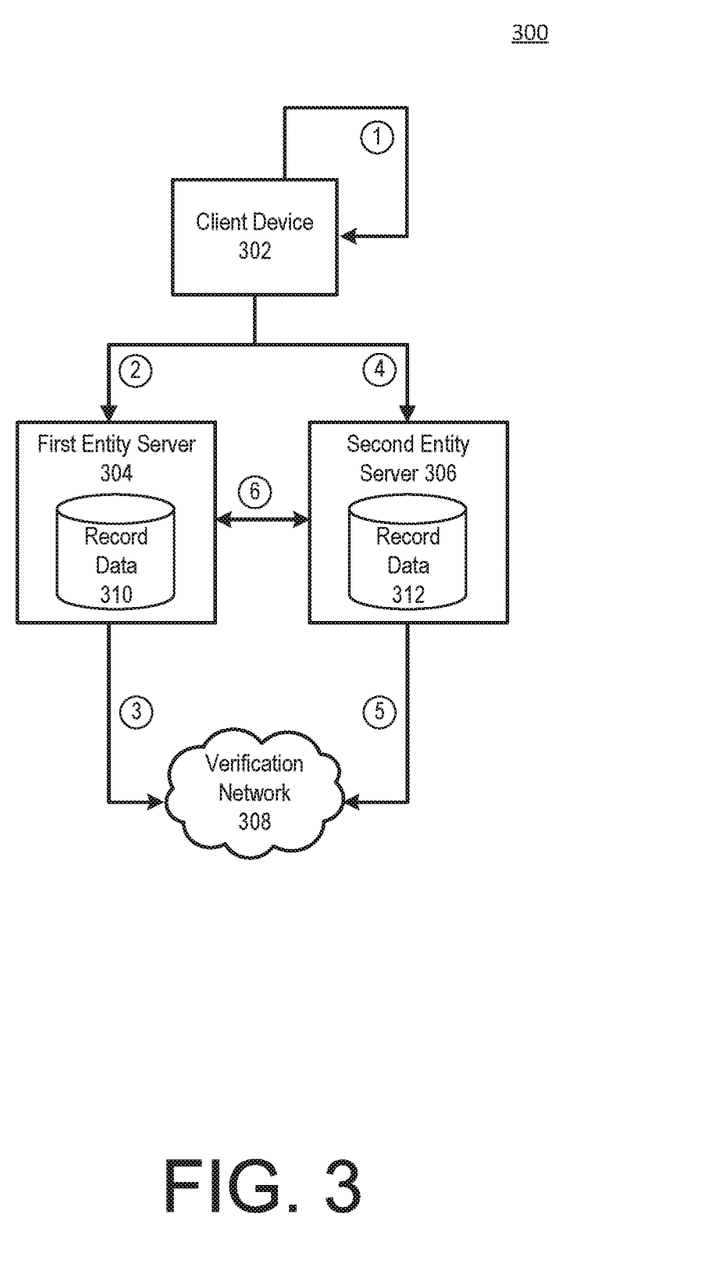
FIG. 3 depicts an illustrative example of a process that may be performed in accordance with at least some embodiments of the disclosure.

FIG. 3 depicts an illustrative example of a process 300 that may be performed in accordance with at least some embodiments of the disclosure. In FIG. 3, a client device 302 may be in communication with one or entity servers (e.g., first entity server 304 and/or second entity server 306). Each of these entity servers may be in communication with a verification network 308.

By way of non-limiting illustration, each of the first entity server 304 and the second entity server 306 may be computing devices operated by banking institutions. In this example, a user may open an account at the first entity server 304 at a first point in time, and may subsequently open an account at the second entity server 306 at a later point in time. As will be illustrated by process 300, the information provided to the first entity server 304 may also be securely provided to the second entity server 306 with minimal effort on behalf of the user. Additionally, each of the first entity server 304 and the second entity server 306 may gain access to information on any transactions conducted by the user, allowing that entity to better analyze risk associated with a user.

At step 1 of process 300, a client device 302 may generate an electronic record. In some embodiments, the electronic record generated by the client device may be associated with a string of characters, such as an electronic identifier. In some embodiments, the generated electronic record may include an indication of the user and/or information associated with the user. In some embodiments, the electronic record may include only the electronic identifier without any indication of the user to which it relates. In some embodiments, an electronic record may be generated on behalf of the client device 302 by a separate application server which provides backend support for an application installed on, and executed from, the client device 302. It should be noted that in some embodiments, the electronic record may not be generated by a client device 302, and may be generated instead by a first entity server 304 as described below. In some embodiments, the electronic record may include an indication of a passphrase needed to access information in the electronic record. In these embodiments, the passphrase may be activated upon the electronic record being authenticated by a trusted entity (e.g., a banking institute).

In some embodiments, the client device 302 may be associated with a private key and public key. In these embodiments, the private key may be stored by the client device 302 (e.g., within a secure memory). The public key may be provided to the verification network to be distributed to one or more remote nodes included within the network. In some embodiments, the public key associated with the client device 302 may be stored in a record maintained by the verification network. An application server associated with the client device may generate the private and public key to be associated with the client device upon receiving a request to create an electronic record.

At step 2 of process 300, a user of the client device 302 may initiate a transaction with a first entity. In some embodiments, the client device 302 may provide an indication of an electronic identifier to the first entity server 304 to initiate the transaction. In some embodiments, the first entity server 304 may independently generate the electronic identifier from user-specific information provided by the user in an action request. The first entity server 304 may then locate an electronic record associated with the user within the record maintained by the verification network by compiling each of the transactions recorded in a record maintained by the network associated with the electronic identifier or a hash of the electronic identifier. The first entity server 304 may, upon locating the electronic record, verify the authenticity of at least some of the interaction records within the electronic record using public keys associated with those interaction records.

Upon independently verifying the authenticity of the user (e.g., by checking an identification associated with the user), the first entity server 304 may store a number of details associated with the user in a record database 310, associate the electronic identifier with the user details, append a location (e.g., a location in a database) of the user details to an interaction record, sign the interaction record using its private key, and provide the signed interaction record to the verification network 308 to be associated with the electronic record (e.g., a blockchain). In some embodiments, the record data 310 may include a number of documents and/or transaction details that relate to the user's financial status. For example, the record data 310 may include references to assets associated with a user (e.g., property deeds, etc.), outstanding lines of credit for that user, and/or any other suitable information relevant to that user's financial standing.

In some embodiments, the first entity server 304 may generate an electronic record for a user. For example, the first entity server 304 may combine a number of information fields that any entity transacting with the user would have access to. In some embodiments, the first entity server 304 may then further process the combined data (e.g., by hashing that data) into an electronic identifier. For example, the first entity server may create an electronic identifier by combining user specific information such as a country code, customer name, date of birth, and last four digits of a social security number such as "SHA256(USA*JOHN SMITH*19700101*1234)." In this example, the first entity server may then hash this electronic identifier using a publicly available hash function to obtain a hash of the electronic identifier such as the string "444E982513BF54605002D079FF5D65AB6E318E1AB50 100B05F810D353487." An interaction record for a transaction conducted between the first entity and a user may then be created with respect to this hash of the electronic identifier. In this way, the electronic record may be located and/or added to by any entity which is in possession of certain user-specific information, while hashing the user-specific information prevents that user-specific information from being obtained by an unauthorized third party. Additionally, there is no way to ascertain the electronic identifier from the hash value. This means that the first entity server 304 may require any requestor of user data to provide the electronic identifier in order to prove that the requestor has authority to access the user data. This prevents an unauthorized entity from stumbling upon the interaction record and simply requesting sensitive user information from the first entity, as the unauthorized entity would not have access to the electronic identifier.

By way of illustrative example, consider the following scenario. In some embodiments, at least one of the separate entities (e.g., the first entity and/or the second entity) may maintain a physical location. For example, the first entity may comprises a banking institution operating a branch location. In this example, a user operating the client device 302 may enter the branch location in order to establish an account, request a loan, or perform any other suitable operation. The user may independently provide a number of financial details to the banking institution, which may subsequently be stored with respect to the user by the first entity server 304 in record data 310 by the banking institution servers. In addition, the banking institution may obtain an electronic identifier associated with the user. Upon verifying the authenticity of the user and the authenticity of the financial details provided by the user, the banking institution may append a location of the user information stored in the record data 310 to a new interaction record to be associated with the electronic identifier (e.g., by including the hashed electronic identifier). The banking institution may then sign the interaction record that includes the location of the user information using a private key associated with that banking institution (and also associated with the first entity server 304).

At step 3 of process 300, the first entity server 304 may provide the newly signed interaction record to the verification network 308 to be associated with the electronic record and provided to remote nodes. At any point in time, a node or entity may authenticate portions of the electronic record (e.g., individual interaction records associated with the electronic record). To do this, the node may identify an entity that signed an interaction record associated with the electronic record, identify that entity's public key, and use that public key to verify that the interaction record was signed using the entity's private key. This may involve verifying the interaction record using the public key in order to verify a particular format or content of the interaction record. It should be noted that the electronic record may not readily be associated with a user. For example, the electronic identifier associated with the electronic record may be subjected to a hash function and/or may be encrypted. In this way, an entity provided with an indication of an electronic identifier may perform the hash function to obtain the electronic record, whereas other entities would be prevented from accessing data within the electronic record as they are unable to ascertain the appropriate electronic identifier and/or hash value.

In some embodiments, processing of transactions submitted to the verification network 308 is performed by servers operated by a number of other entities. The verification network 308 may operate on a "gas consumption" model, in which "gas" is awarded to entities that process transactions and gas is consumed for each transaction that an entity submits. The amount of gas awarded for the processing of a particular transaction may be proportional to the amount of processing required for that transaction. Additionally, gas limits may be set to prevent processing-intensive transactions. In this way, entities may be prevented from continuously submitting frivolous or unwarranted transactions to the verification network 308 and entities are provided an incentive to perform the processing required by the system. In some embodiments, each transaction may be associated with a gas price, enabling the submitting entity to set an amount of gas that it is willing to expend per processing unit. This effectively allows the submitting entity to "bid" on the amount that it is willing to expend, and enables a processing entity to select profitable transactions to process. Additionally, receipts may be generated for each transaction submitted/processed that includes, amongst other data, a total amount of gas consumed/awarded for the processing of the transaction.

At step 4 of process 300, a second entity (e.g., another bank) may locate the electronic record. For example, the second entity may locate an electronic record by identifying each transaction associated with a particular electronic identifier. In some embodiments, an indication of the electronic record may be provided to the second entity server 306 (e.g., by the client device). In some embodiments, the user may submit a request or application in relation to the provided electronic record and the second entity may locate the electronic record based on user-provided information. Upon locating the electronic record within the verification network 308, the second entity server 306 may identify a number of transactions associated with the electronic record. In some embodiments, the transactions associated with the particular electronic record may be in the form of a record (e.g., a blockchain) distributed to nodes of the verification network 308.

At step 5 of process 300, the second entity server 306 may verify one or more interaction records comprising the electronic record. In some embodiments, the electronic record may include a number of interaction records signed by a number of different entities, each of which is associated with a public key stored in a repository of public keys. The second entity server 306 may identify the different entities and determine a trust value to be associated with each of those entities. The second entity server 306 may then identify each entity associated with a trust value that exceeds a trust threshold from which to obtain user data. For example, if the user of the client device 302 is associated with many different interaction records involving two very large, well known and trustworthy banks, and two smaller merchants that are not very well known, then the trust values for the banks may be higher than the smaller merchants since the banks are well known and subject to strict government regulation whereas the smaller merchants are not.

The second entity server 306 may send requests for information to the first entity server 304. For example, the first entity server 304 may be associated with a first bank that holds a loan for a user of the client device 302. The second entity server 306 may be associated with a second bank where the user wants to apply for another loan. The second entity server 306 may contact the first entity server 304 to request information about the user.

At step 6 of process 300, the second entity server 306 may request user information stored by the first entity server 304 at the location indicated in the interaction record. The second entity server 306 may formulate the request in a specific format and/or include specific information (e.g., the electronic identifier). Upon receiving the request, the first entity server 304 may verify the format/information of the request and identify the user information to be provided in response within the record data 310. The second entity server 306, upon receiving the response, may store the received information in record data 312. The second entity server 306 may then determine, based on the received information, whether to conduct an action requested by the user. Upon conducting the transaction, the second entity server 306 may create a new interaction record for the conducted transaction, which it may sign using its private key and provide to the verification network 308 to be added to the electronic record.

Continuing with the scenario described above with respect to step 2, the user associated with the electronic record may wish to perform a second operation at a second banking institution. The second banking institution may operate the second entity server 306. For example, the user may wish to apply for a loan at the second banking institution operating the second entity server 306. In this example, the user may submit an indication of the electronic record along with his or her application for the loan. The second banking institution associated with the second entity server 306 may subsequently determine, by retrieving information associated with the electronic record from a verification network, that the user has previously conducted a transaction with the first banking institution operating the first entity server 304 described above. The second banking institution operating the second entity server 306 may then verify the signature of the first banking institution and obtain a location (e.g., a database location) of the user's data maintained by the first banking institution operating the first entity server 304 from the verified portion of the electronic record. The second banking institution operating the second entity server 306 may then request the user's data from the first banking institution. In some embodiments, the second banking institution operating the second entity server 306 may be required to provide an electronic identifier to the first banking institution operating the first entity server 304 that may be obtained by verifying the user's portion of the electronic record using his or her public key to verify that it has permission to receive the data. In some embodiments, the second banking institution operating the second entity server 306 may determine a trust value to be associated with the first banking institution operating the first entity server 304. The second banking institution operating the second entity server 306 may assign a weight to the data received from the first banking institution operating the first entity server 304 based on the trust value that it has associated with the first banking institution first entity server 304. The second banking institution operating the second entity server 306 may then populate a number of customer-specific data fields with information received from the first banking institution operating the first entity server 304. In some embodiments, the second banking institution operating the second entity server 306 may only populate the customer-specific fields upon determining that the trust value exceeds a predetermined trust threshold. In this way, the user may not be required by the second banking institution operating the second entity server 306 to provide any customer-specific data, as it may be obtained from other entities.

In some embodiments, the first entity server 304 and the second entity server 306 may use first and second aliases, respectively. These aliases may be used in conjunction with the previously described electronic identifier (e.g., in hashed or non-hashed form) to identify a particular user's affiliation with a particular institution or particular server associated with that institution. For instance, an alias for a first bank and a second bank may simply be "bank 1" and "bank 2" respectively.

Figure 4:
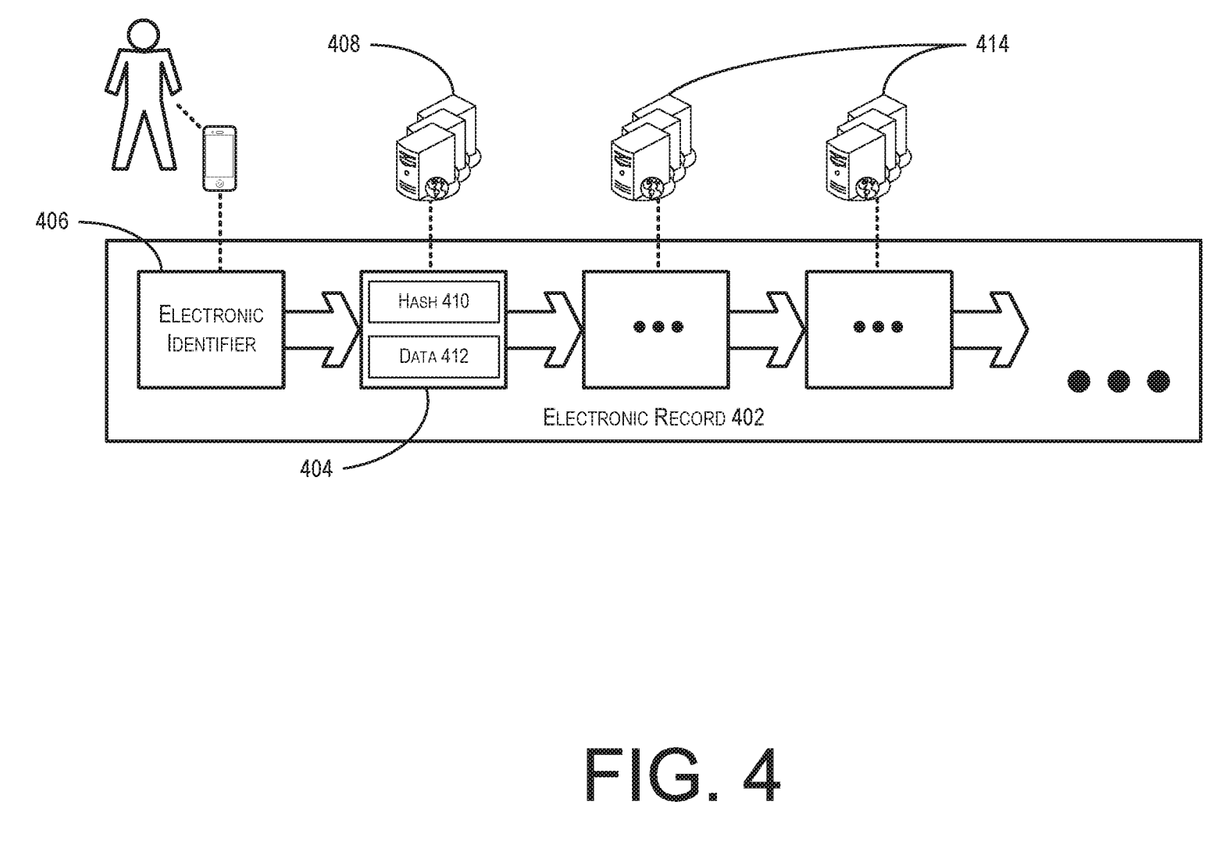
FIG. 4 depicts an example electronic record that may be implemented in accordance with embodiments of the disclosure.

FIG. 4 depicts an example electronic record that may be implemented in accordance with embodiments of the disclosure. In FIG. 4, an electronic record 402 may comprise a record or other record of interaction records 404 distributed across a verification network. In some embodiments, the record may comprise a blockchain, in which a number of interaction records related to various electronic identifiers are processed in a "block," the record of which is then distributed to a number of nodes of the verification network as part of a blockchain.

As described above, a number of interaction records 404 may be associated with an electronic identifier 406. In some embodiments, the electronic identifier may be generated for a particular person, device, or entity. In some embodiments, the electronic identifier 406 may be generated by a client device or application server on behalf of a client device. In some embodiments, the electronic identifier 406 may be generated by an entity conducting a transaction with the person, device, or entity. For example, the electronic identifier may be generated according to a specified format using information related to the person, device, or entity.

As the person, device, or entity conducts transactions with various entities, servers 408 associated with those entities may generate interaction records 404 and sign them with a private key associated with that entity. The servers may include an indication of the electronic identifier 406 in the interaction record 404. In some embodiments, the interaction record may include a hash 410 of the electronic identifier 404. The interaction record 404 may include additional data 412. In some embodiments, the additional data 412 included in an interaction record 404 may comprise an indication of a location of user-specific information stored in a database by the entity that generated the interaction record 404. In some embodiments, the additional data 412 may also comprise an indication of the transaction conducted, a credit score assigned to a user by the entity, or any other suitable information.

As the person, person, device, or entity conducts transactions with various other entities, additional servers 414 associated with those entities may generate additional interaction records 404 that are subsequently associated with the electronic record 402. In this way, an electronic record 402 may be generated to include a number of transactions conducted by the person, device, or entity with various other entities. The electronic record 402 may be used to assess a credit rating, transaction history, credentials, or any other suitable report for the person, person, device, or entity.

Figure 5:
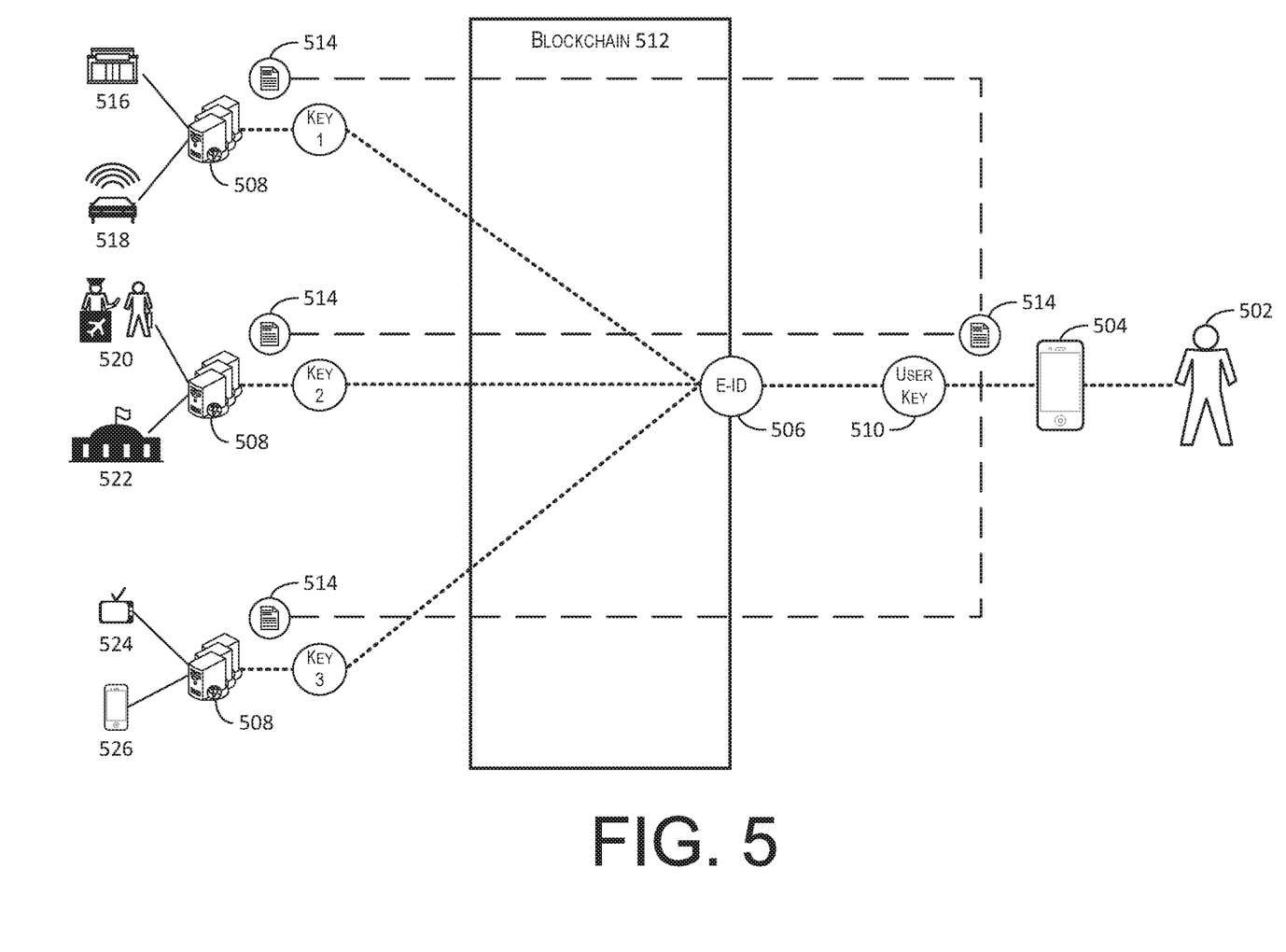
FIG. 5 depicts an illustrative example of various embodiments of an electronic record in accordance with the disclosure.

FIG. 5 depicts an illustrative example of various embodiments of an electronic record in accordance with the disclosure. In some embodiments, a user 502 in possession of a client device 504 may provide an electronic identifier (e-ID) 506 to one or more of a number of entities 508. In some embodiments, the electronic identifier 506 may be signed using a private key 510 associated with the user 502.

In embodiments of the disclosure, an entity 508 receiving the electronic identifier 506 may identify an electronic record within a blockchain 512 or other suitable record. As described above, the blockchain 512 may comprise a record stored within a distributed computing environment. The entity 508 may, upon receiving the electronic identifier 506, retrieve a number of interaction records associated with the electronic identifier 506 within the blockchain 512. Each of the interaction records may be signed using a private key. Upon retrieving a number of interaction records associated with the electronic identifier, the entity 508 may verify the authenticity of each of the interaction records using a public key. Upon verifying each interaction record, the entity 508 may request user-specific information 514 (e.g., sensitive information related to the user) from the originator of the interaction record.

Each entity 508 may separately store user-specific information 514 in a data store. Each entity 508 may provide user-specific information 514 to another entity that requests it. The requesting entity may store the user-specific information in its own data store. By way of illustration, consider the scenario in which a user 502 wishes to interact with an entity 508. In this scenario, the user may provide his or her electronic identifier 506 to the entity 508. In some embodiments, the user may provide personal information to the entity 508, and the entity may use the personal information to independently generate the electronic identifier. The entity 508 may then request information related to the user from one of the entities associated with an interaction record within the blockchain 512. The entity 508 may then use the requested information to populate a number of user-specific details without requiring the user to provide that information. The entity 508 may then determine whether or not to conduct the requested interaction based on the provided information.

Embodiments of the disclosure may provide a number of useful applications. For example, embodiments of the disclosure may provide a merchant 516 with quick access to a credit and/or transaction history in order to enable it to quickly decide whether to extend a line of credit to the user 502. Embodiments of the disclosure may also provide a transaction history for a connected device 518 (e.g., an internet of things (IOT) device). This allows the connected device 518 to conduct transactions on behalf of a user of that connected device 518. Embodiments of the disclosure may provide a means of identifying a user 502. For example, secure checkpoints 520 and/or government entities 522 may use an electronic record to quickly authenticate a user 502 as well as to determine what entities that user 502 is affiliated with. Embodiments of the disclosure may provide a user 502 with the ability to make purchases from a smart device, such as a smart television 524 or smart phone 526.

Figure 6:
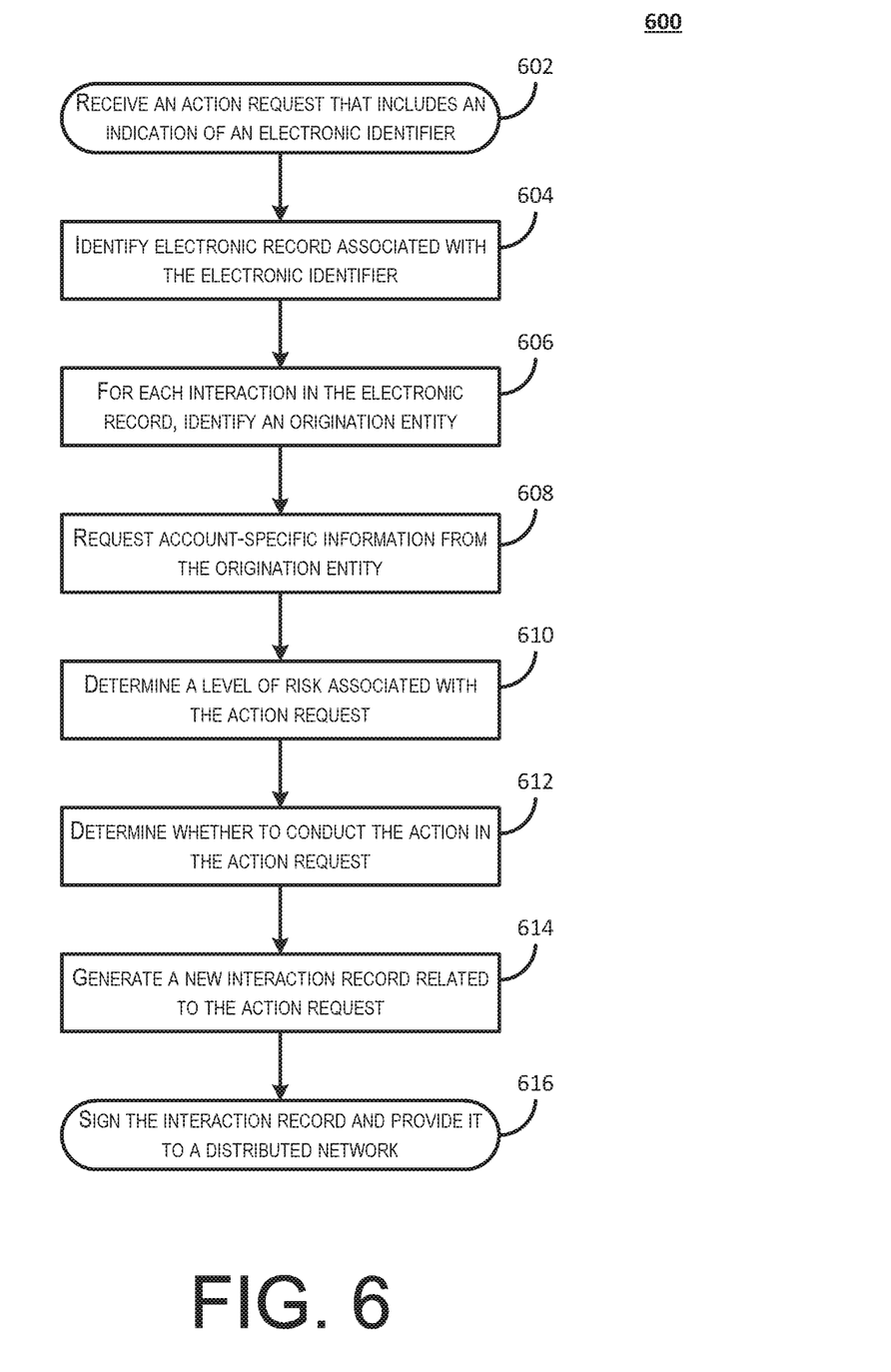
FIG. 6 depicts an example process for generating and maintaining an electronic record in a distributed environment in accordance with at least some embodiments.

FIG. 6 depicts an example process for generating and maintaining an electronic record in a distributed environment in accordance with at least some embodiments. Some or all of any of the processes described herein (or variations and/or combinations thereof) may be performed under the control of one or more computer systems configured with executable instructions and may be implemented as code (e.g., executable instructions, one or more computer programs or one or more applications). In accordance with at least one embodiment, the process 600 of FIG. 6 may be performed by at least an entity server as depicted in FIG. 1 and FIG. 2. The entity server may be a node entity of a verification network. The code may be stored on a computer-readable storage medium, for example, in the form of a computer program including a plurality of instructions executable by one or more processors. The computer-readable storage medium may be non-transitory.

Process 600 may begin at 602, when an action request is received by a computing entity (e.g., a server associated with a banking institution). In some embodiments, the action request may be received along with an electronic identifier. In some embodiments, an electronic identifier may be generated based on information provided in association with the action request. In some embodiments, the action request may be a request to initiate a particular transaction/interaction between the receiving entity and a particular person, device, or entity.

At 604, the computing entity may identify an electronic record associated with the electronic identifier. To do this, the computing entity may identify and compile a number of interaction records associated with the electronic identifier via a log maintained with respect to a distributed environment. Each interaction record may include an indication of an interaction that took place between the requestor and another entity. In some embodiments, an interaction record may include a number of details related to the interaction. In some embodiments, an interaction record may include the electronic identifier (or a hash of the electronic identifier), an indication of an origination entity, and a record location indicator.

At 606, the computing entity may determine an origination entity for each of the interaction records. The computing entity may also verify the authenticity of each interaction record. For example, each of the identified interaction records may be signed using a private key associated with the origination entity. To verify the authenticity of a particular interaction record, the computing entity may identify a public key associated with the origination entity, verifying the signature of the origination entity. In some embodiments, the computing entity may calculate a trust value to be associated with each identified origination entity. A trust value may provide a quantitative representation of an amount to which the computing entity trusts information provided by the origination entity. In some embodiments, the trust value may be determined based on a type of the origination entity, a credit rating of the origination entity, a length of time that the origination entity has existed, a number of total interaction records submitted by the origination entity, or any other suitable information related to an origination entity. In some embodiments, the computing entity may filter, or remove from consideration, interaction records associated with origination entities that fail to exceed a predetermined trust value threshold.

At 608, the computing entity may request account-specific data from the origination entity. In some embodiments, the computing entity may generate an information request to be routed to the origination entity. In some embodiments, the information request may include the electronic identifier to verify that the computing entity has authority to generate the request. In some embodiments, the information request may include a location of a data file to be provided. In some embodiments, the information request may be signed by the computing entity using the computing entity's private key. In this way, the information request may be verified by the originating entity using the computing entity's public key. The computing entity may store at least a portion of the account-specific information in a database. For example, the computing entity may populate a number of fields of a database entry with the received information.

In some embodiments, the computing entity may assign a weight to information received from the origination entity based on a trust value associated with that origination entity. By way of illustrative example, the computing entity may determine that it trusts banking institutions more than it trusts private landlords. In this example, it may assign a high trust value to interactions of the electronic record that originate with a banking institution and a lower trust value to interactions of the electronic record that originate with a private landlord. In this example, account-specific information that is received from a banking institution may be given a greater weight than account-specific information that is received from a private landlord.

At 610, the computing entity may determine a level of risk associated with an action indicated in the action request based on the received account-specific data. For example, the computing entity may assess a level of financial ability and/or liquidity associated with the account. In some embodiments, the level of risk may be determined by comparing a number of assets associated with the account to liabilities associated with the account. In some embodiments, one or more of the interaction records may include an indication of a credit score assigned to the account based on an assessment of the account performed by the originating entity. It should be noted that once the computing entity has received account-specific information, there are a number of ways in which one skilled in the art could determine a level of risk.

At 612, the computing entity may determine whether to conduct an action indicated in the action request based on the determined level of risk. For example, the computing entity may determine whether the level of risk is above or below a predetermined risk level threshold or whether the level of risk is within an acceptable range. In some embodiments, one or more of the identified interaction records may include an indication of a level of risk (e.g., a credit score). In this scenario, the computing entity (provided that a level of trust associated with the interaction record is above a trust level threshold) may adopt the level of risk indicated in the interaction record.

At 614, the computing entity may generate a new interaction record related to the action indicated in the action request. In some embodiments, the computing entity may generate a new interaction record upon completing the requested action (i.e., when the action has been approved). In some embodiments, the computing entity may generate an interaction record whether the action is approved or declined, with an indication as to the status of the action. It should be noted that in some embodiments, the electronic record may be updated whether or not permission is received from the account associated with the electronic record. For example, the electronic record may be used as a credit reporting tool, wherein each interaction record reflects an interaction with another entity, whether positive or negative. In this example, an entity need not seek approval from an account holder to create a new interaction record associated with that account.

At 616, the computing entity may sign the new interaction record using its private key and provide the new interaction record to the distributed environment to be added to the electronic record. The new interaction record may then be added to a "block" of transactions, processed by a remote node, and recorded in a distributed log (e.g., a blockchain ledger).

Embodiments of the invention provide for a number of technical advantages. For example, an electronic record for a particular consumer is distributed across a number of remote nodes, which may each be operated by different entities. By distributing the electronic record in this fashion, no central authority is given control over it. Consumers and service providers alike have full, unfettered access to any particular electronic record. Additionally, in some embodiments, in order to access the electronic record, the potential accessor must have access to sensitive information needed to generate the electronic record. This prevents unauthorized parties from accessing information that they do not have authority to access. Accordingly, the disclosure provides a system in which electronic records are fully accessible, and yet are still secure.

Additionally, the system of the disclosure provides for a number of additional advantages. For example, the system can act as a decentralized credit authority, in that an electronic record may be analyzed by a service provider in order to make a more accurate determination as to the level of risk associated with a particular consumer or device. In this example, the service provider is able to analyze each transaction conducted between a consumer and another entity. The service provider may determine how much weight to give each of those transactions based on a level of trust that it has for the parties to the transaction. Rather than simply accepting a credit score from a credit bureau, the service provider is given access to raw data and may utilize its own algorithm to assess risk.

In another example, the system allows a user to request a service from a new service provider without filling out forms or providing much information. In the disclosed system, a consumer is able to provide user-specific information to a first service provider. The user may then simply provide a few details in future requests to different service providers, and those service providers can generate an electronic identifier, determine that the user has previously interacted with the first service provider, and request the user's information directly from that first service provider without requiring the user to provide the details. This system is not only more convenient, but also more secure, as the user's information is less exposed.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents. For example, although the described embodiments mention the use of electronic records in order to assess a risk level of an action, an electronic record can also be used to access data or other services. For example, electronic records may be used to gain access to a location or service (e.g., a train ride or concert). In this example, the electronic record may include an interaction record which indicates that a ticket has been associated with an account.

One or more features from any embodiment may be combined with one or more features of any other embodiment without departing from the scope of the invention.

A recitation of "a", "an" or "the" is intended to mean "one or more" unless specifically indicated to the contrary.

All patents, patent applications, publications, and descriptions mentioned above are herein incorporated by reference in their entirety for all purposes. None is admitted to be prior art.

What is claimed is:

1. A server apparatus for processing an action request from a user by verifying an electronic record comprising a number of interaction records of transactions stored in a blockchain, wherein the transactions are conducted between the user and a number of other entities via a verification network, the server apparatus comprising:
   one or more processors; and
   a memory storing a database and including instructions that, when executed by the one or more processors, cause the server apparatus to:
      receive a request from a computing device of the user to conduct an action with respect to the user, the request including an electronic identifier;
      based on the received electronic identifier, identify, within the verification network, the electronic record comprising the number of interaction records associated with the electronic identifier, wherein each of the interaction records comprises the electronic identifier, a signature of an originating entity and a record location indicator, wherein the signature is generated by the originating entity using a private key of the originating entity, wherein the record location indicator is an indication of user information stored in the originating entity;
      for at least a first interaction record of the number of interaction records:
         determine a first originating entity for the first interaction record;
         identify a first public key of the first originating entity;
         verify an authenticity of the first interaction record of by verifying the signature using the first public key associated with the first originating entity;
         transmit an information request, to the first originating entity, wherein the information request comprises the electronic identifier and a first record location indicator;
         in response to the information request, receive, from the first originating entity, a user information of the user;
         determine a first trust value for the first originating entity based at least in part on at least one of a type of the first originating entity, a credit rating of the originating entity, or a number of total interaction records submitted by the first origination entity to the server apparatus; and
         determine whether the first trust value exceeds a threshold;
      determine, based at least in part on (A) the received user information of the user and (B) the first trust value exceeding the threshold, whether to approve the requested action;
      based on determining that the requested action is approved, complete the requested action by populating a number of customer data fields on a form for the user with the received user information of the user;
      generate a second record location address;
      store the populated form in the database via the second record location address;
      generate a second interaction record, wherein the second interaction record comprises the electronic identifier and the second record location address;
      sign the second interaction record; and
      provide the signed second interaction record to the verification network.

2. The server apparatus of claim 1, wherein determining whether to approve the requested action comprises determining a risk assessment for the user.

3. The server apparatus of claim 2, wherein the risk assessment for the action takes into consideration the trust value determined for each originating entity associated with the number of interaction records in the electronic record.

4. The server apparatus of claim 1, wherein the instructions, that when executed by the one or more processors, further cause the server apparatus to request additional information associated with the user from at least one originating entity associated with an interaction record of the number of interaction records.

5. The server apparatus of claim 4, wherein the instructions, that when executed by the one or more processors, further cause the server apparatus to:
   receive the requested additional information associated with the user from the at least one originating entity; and
   store the requested additional information associated with the user in relation to an account associated with the user.

6. The server apparatus of claim 1, wherein the user information is in a predetermined format.

7. The server apparatus of claim 1, wherein the electronic identifier is a hash function to the user information of the user.

8. The server apparatus of claim 5, wherein determining whether to execute the action comprises:
   determining a risk assessment based on the accessed additional information associated with the user; and
   determining whether the risk assessment is within an acceptable range.

9. A method for processing an action request from a user by verifying an electronic record comprising a number of interaction records of transactions stored in a blockchain, wherein the transactions are conducted between the user and a number of other entities via a verification network, comprising:

receiving, by a server apparatus, a request from a computing device of the user to conduct an action with respect to the user, the request including an electronic identifier;

based on the received electronic identifier, identifying, by the server apparatus and within the verification network, the electronic record comprising the number of interaction records associated with the electronic identifier, wherein each of the interaction records comprises the electronic identifier, a signature of an originating entity and a record location indicator, wherein the signature is generated by the originating entity using a private key of the originating entity, wherein the record location indicator is an indication of user information stored in the originating entity;

for at least a first interaction record of the number of interaction records:

determining, by the server apparatus, a first originating entity for the first interaction record;

identifying, by the server apparatus, a first public key of the first originating entity;

verifying, by the server apparatus, an authenticity of the first interaction record of by verifying the signature using the first public key associated with the first originating entity;

transmitting, by the server apparatus, an information request, to the first originating entity, wherein the information request comprises the electronic identifier and a first record location indicator;

in response to the information request, receiving, by the server apparatus and from the first originating entity, a user information of the user;

determining, by the server apparatus, a first trust value for the first originating entity based at least in part on at least one of a type of the first originating entity, a credit rating of the originating entity, or a number of total interaction records submitted by the first origination entity to the server apparatus; and determining by, the server apparatus, whether the first trust value exceeds a threshold;

determining, by the server apparatus and based at least in part on (A) the received user information of the user and (B) the first trust value exceeding the threshold, whether to approve the requested action;

based on determining that the requested action is approved, completing, by the server apparatus, the requested action by populating a number of customer data fields on a form for the user with the received user information of the user;

generating, by the server apparatus, a second record location address;

storing, by the server apparatus, the populated form in a database via the second record location address;

generating, by the server apparatus, a second interaction record, wherein the second interaction record comprises the electronic identifier and the second record location address;

signing, by the server apparatus, the second interaction record; and providing, by the server apparatus, the signed second interaction record to the verification network.

10. The method of claim 9 wherein determining whether to approve the requested action comprises determining a risk assessment for the user.

11. The method of claim 10 wherein determining the risk assessment includes determining a level of trust to be associated with each originating entity associated with an interaction record for the electronic identifier, wherein different levels of trust may be determined for each originating entity.

12. The method of claim 9, wherein the user information of the user includes sensitive information associated with the user.

13. The method of claim 12, wherein the request includes a document address included in an interaction record and the user information of the user that is obtained from a document located at the document address.

14. The method of claim 12, wherein the form is a credit extension form maintained with respect to the user.

* * * * *